May 3, 1927.  
F. S. CRAVENS  
1,627,486  
VALVE  
Original Filed May 19, 1925   2 Sheets-Sheet 1
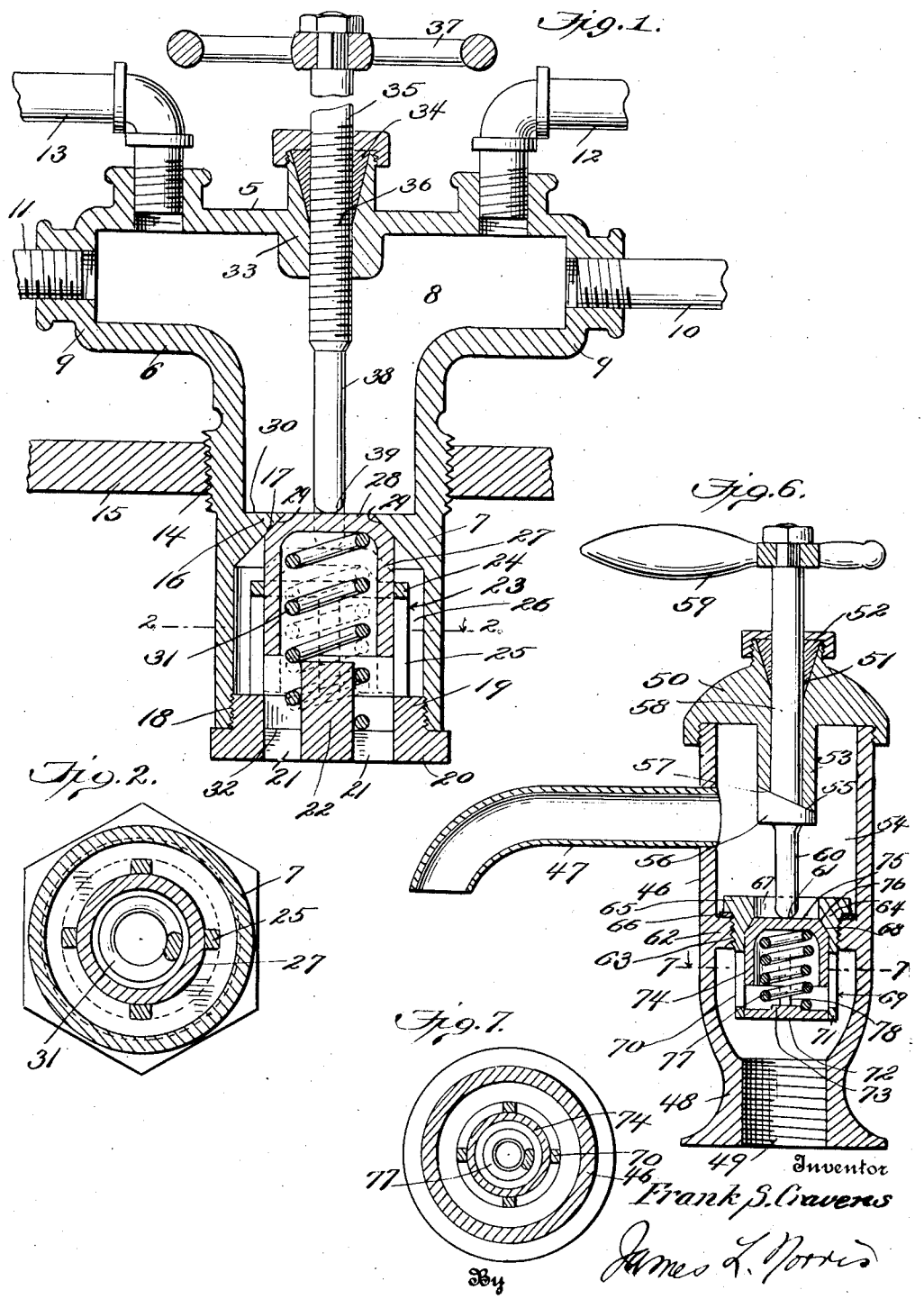

May 3, 1927.
F. S. CRAVENS
VALVE
Original Filed May 19, 1925   2 Sheets-Sheet 2
1,627,486
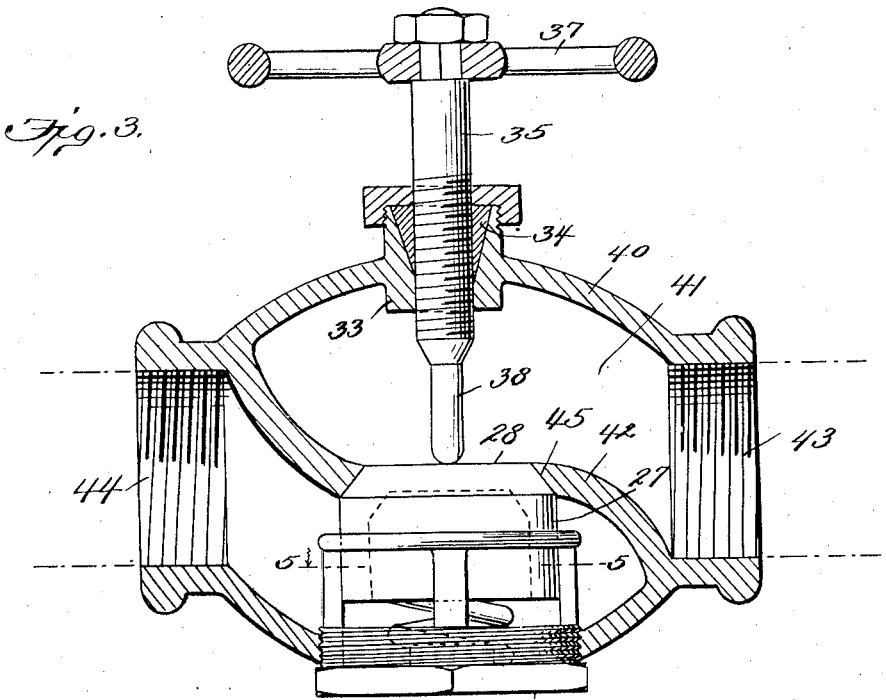
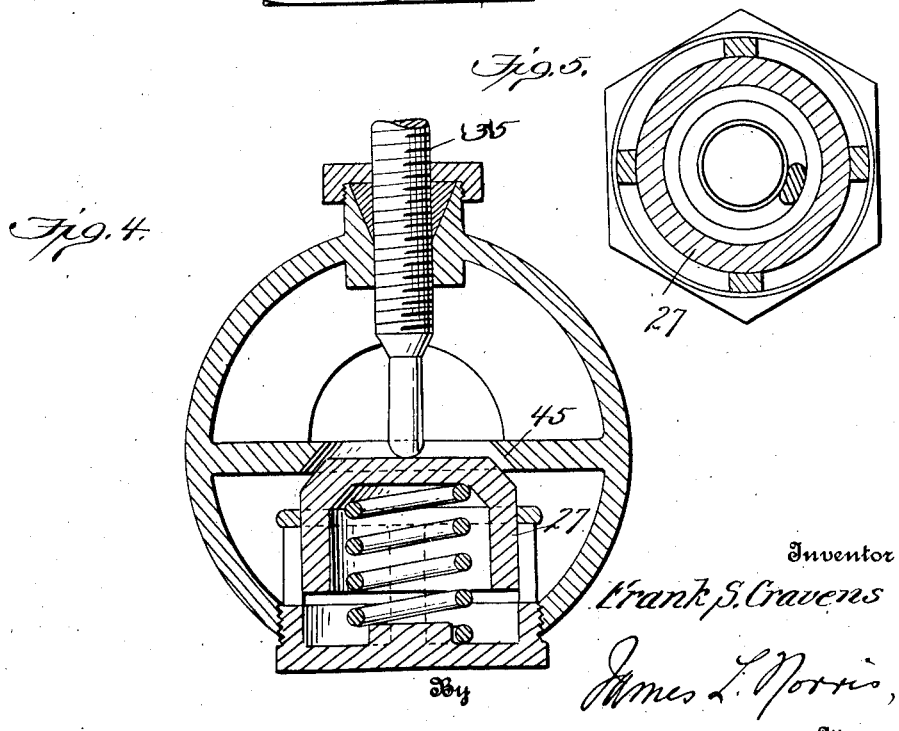
Inventor
Frank S. Cravens
By James L. Norris,
Attorney Patented May 3, 1927.

1,627,486

UNITED STATES PATENT OFFICE.

FRANK S. CRAVENS, OF OLIVE HILL, KENTUCKY.

VALVE.

Application filed May 19, 1925, Serial No. 31,424. Renewed March 14, 1927.

This invention relates to valves for general application, and the primary object of the same is to provide a valve element, a cage therefor and resilient means for automatically seating the valve, all assembled as a unit which may be easily applied in operative position to the valve casing and with which a valve stem end has pressure contact but no connection with relation to the upper or top portion of the valve element, and whereby the valve element may be opened by downward pressure thereon through depression of the valve stem and automatically seats itself in normal closed position when the pressure of the valve stem is relieved therefrom.

A further object of the invention is to provide a valve organization of such structure that the essential valve means, or the element controlling the open and closed condition of a passageway, may be readily placed in position and easily operated and having structural features to reduce the cost of manufacture and installation, and wherein also the main or essential valve element automatically moves to closed position but having the valve stem terminal disposed to exert only surface pressure contact with relation to the said element to open the same, and thus prevent injury to valves which frequently occurs in that type of valve wherein the valve stem is connected to the valve element.

A still further object of the invention is to provide a valve mechanism wherein the valve element will be automatically closed in the event the valve stem becomes broken or displaced by exterior shocks or jars, and thereby render the valve particularly useful in connection with various steam and other pipe lines of locomotive engines and wherein in the case of accidents or wreckage and damage to the valve stem, the valve element will automatically seat or close itself.

With the foregoing and other objects and advantages in view, the invention consists in the construction and arrangement of the several parts which will be more fully hereinafter described and claimed.

In the drawings:

Fig. 1 is a vertical section through the improved valve adapted for installation in connection with a locomotive engine.

Fig. 2 is a horizontal section on the line 2—2, Fig. 1.

Fig. 3 is a longitudinal vertical section of a globe valve, showing the improved valve mechanism embodied therein.

Fig. 4 is a transverse vertical section through the valve shown by Fig. 3.

Fig. 5 is a horizontal section on the line 5—5, Fig. 3.

Fig. 6 is a sectional view of a hot or cold water valve organization embodying the features of the improvement.

Fig. 7 is a horizontal section on the line 7—7, Fig. 6.

Referring to Figs. 1 and 2, the valve casing comprises a top member 5, a bottom member 6 with a depending valve seat member 7, these members forming the walls for a chamber 8. In the ends 9 of the chamber 8 pipes or conduits 10 and 11 are connected, and to the top member other pipes 12 and 13 are also connected on opposite sides of the center, these pipes all having communication with the chamber 8. The valve seat member 7 is held by a threaded connection 14 to a suitable support 15, the valve seat member 7 depending below the said support 15 a considerable distance and having formed therein an annular flange 16 with an upwardly converging or conical valve seat 17. The lower terminal of the valve seat member 7 is internally screw-threaded, as at 18, and therein is fitted the screw-threaded flange 19 of a plug 20 having openings 21 through the bottom thereof and also extending through the flange 19. Rising from the bottom of the plug 20 is a center post 22 which extends above the upper end of the flange 19, and also rising from the top of the flange is an annular cage 23 having an upper rim 24 with supports 25 between the same and the top end of the flange 19. The cage 23 projects upwardly into the chamber 26 of the member 7 and the rim 24 is located a predetermined distance below the valve seat 17. Movably mounted within the cage 23 is a valve 27 having an upper flat top 28 with the corners 29 cut off at an angle to conform to the angle of the valve seat 17 and so proportioned are the dimensions of the top of the said valve as to permit the latter to snugly fit the valve seat and have the upper flat surface thereof flush with the upper flat surface 30 of the annular flange 16 when the said valve is closed. This valve 27 is hollow and fully open at the bottom, and extending upwardly thereinto is a spring 31 which bears at its opposite extremities respectively against the bottom of the flat top 28 of the valve and a lower ledge 32 in the plug 20, the said spring always tending to force the valve 27 upwardly into closed position. It will be seen from the foregoing that the plug 20 with its cage 23, the valve 27 and the spring 31, are all assembled in a unitary structure, and when the plug 20 is inserted in the lower end of the tubular valve seat member 7, it carries therewith the valve and spring 31, and thereby all the parts of the valve organization are accurately seated or applied by a simple operation. Conversely, if it is found necessary at any time to remove this valve organization, the withdrawal of the plug 20 will also effect a withdrawal of the valve 27 and spring 31. The valve 27 is free to move vertically within the cage 23 and is reliably supported by the said cage under all conditions so as to accurately register with the valve seat 17. In the top member 5 of the valve casing is an internally screw-threaded valve stem bearing 33 having thereon a gland or analogous joint-sealing means 34, through which movably extends a valve stem 35, partially screw-threaded as at 36 to engage the threads within the bearing 33, the said valve stem having a suitable handle 37 on its upper end and provided with a depending reduced member 38 which has its lower end 39 in contact with the upper flat side 28 of the valve 27 when the said stem is operated to effect such contact. No part of the valve stem 35 is connected to the valve, the operation to open the valve 27 being accomplished simply by pressure of the lower end 39 of the reduced member 38 of the valve stem against the flat top 28 of the said valve and against the resistance of the spring 31. When the valve stem 35 is operated to withdraw the pressure thereof from the flat top 28 of the valve, the valve 27 as a whole is forced upwardly into its seat by the spring 31.

The valve as shown by Figs. 1 and 2 is particularly adapted for locomotive engine service, and all of the features thereof except the plug and valve organization and the stem cooperating with the valve as above explained and the tubular member 7 with its special construction to receive the plug and valve organization, are structural features well known in the art of locomotive engine valves and also in valves having a similar mounting.

In Figs. 3, 4 and 5 the same features of the plug and valve organization and stem are applied to a globe valve having a casing 40 with a chamber 41 divided by a partition 42, to separate end inlet and end outlet 43 and 44 respectively, the partition having an upwardly converged conical valve seat 45 formed therein. The partition, as will be readily understood, divides the chamber 41 into two parts, or controllably separates the inlet from the outlet, and in the center of the bottom portion of the casing 40 the improved plug and valve organization, in all respects similar to that heretofore described, is applied except the opening in the end of the plug to provide for the passage of fluid through the plug to provide for the passage of fluid through the plug is omitted. The valve stem 35 in this instance is also operable in connection with a bearing 33 in the center of the top portion of the casing 40, and in this instance the lower reduced member 38 of the stem is shorter than that shown in Fig. 1, in view of the decrease of distance between the top of the casing 40 and the flat top 28 of the valve 27. Otherwise the plug and valve organization are the same as that shown by Fig. 1 except that the parts are slightly reduced in vertical extent to accommodate the difference in distance between the bottom portion of the casing 40 and the partition 42 and the plug has no opening through its end for the passage of fluid. The same operation and features of advantage of application and removal are present in the form of the valve shown by Figs. 3, 4 and 5 as in the first form described.

In Figs. 6 and 7 the hot or cold water valve comprises a casing 46 of elongated form having an outlet nozzle 47 at the upper portion thereof and a lower base 48 through which is formed a screw-threaded opening 49 for attachment of a screw-threaded supply pipe. On the upper end of the valve casing 46 is a cap 50, through the center of which is a smooth bore 51 having a gland or analogous device 52 applied over the upper terminal thereof. The cap also has a central depending tubular guide 53 extending downwardly into the center of the valve casing or the chamber 54, and the lower end of the said guide is inclined or formed with a cam surface 55, with which cooperates a cam collar 56 having an upper cam surface 57 of the same angular contour as the cam surface 55. The collar 56 is fixed on a valve stem 58, rotatably extending through the bore 51 and also projecting above the gland or analogous device 52 and supplied with a suitable handle 59 whereby the stem may be rotated to properly operate the same. The stem below the cam collar 56 has a reduced extremity 60 with a lower rounded end 61. Within the valve casing at a suitable distance above the base 48 is an annular flange 62 which is interiorly screw-threaded, as at 63, and therein is mounted an annular plug 64 having an upper flange 65 bearing on the upper edge of the flange 62, a suitable packing ring 66 being interposed between the said flanges to form a tight or non-leakable joint. The plug has an opening 67 extending therethrough, and at an intermediate point this opening is enlarged by the formation of an outwardly and downwardly diverged frusto-conical valve seat 68. The plug has an integral cage 69 depending therefrom and formed with vertical arms 70 at intervals and terminating at a lower ring 71, which is internally screw-threaded to receive a bottom member 72 formed with a central boss 73. Within the cage 69 a hollow valve 74 is mounted and is in all respects similar to the valves heretofore described and has a flat top 75 with the corners cut off at an angle, as at 76, to fit the valve seat 68, the bottom of the valve 74 being fully open and located a predetermined distance above the bottom member 72 when the said valve is closed. Extending upwardly from the bottom member into the valve 74 is a spring 77, which surrounds a centering pin or post 78 rising from the boss 73 and terminating at such distance above the said bottom member 72 and boss 73 as to effectively hold the spring in central relation to the valve. The opposite extremities of the spring respectively bear against the underside of the closed flat top 75 of the valve 74 and against the bottom member 72 around the boss 73. In this form of valve unit the plug is reversed and has the valve seat formed therein, and the valve stem 58 also only has pressure contact with the flat top 75 of the valve in its operation in opening the said valve, and by turning the valve stem in one direction, the cam faces 55 and 57 operate to force the valve stem downwardly and exert pressure on the valve to open the latter and permit water to flow through the plug and valve organization into the portion of the chamber 54 above the plug and then out through the nozzle or spout 47. When the valve stem 58 is rotated in a reverse direction, the pressure thereof is relieved from the valve 74 and the spring 77 then operates to automatically force the valve to its seat.

From the foregoing it will be seen that the valve in all of its forms has an automatic closing operation, and the valve stem for operating the valve simply exerts a downward opening pressure thereon and is not connected to the valve. This is advantageous in that injury to the valve and disorganization of the same is prevented by improper manipulation of the valve stem, as is often the case in valve organizations where the stem is directly connected to the valve.

It is proposed to utilize the valve and stem organization hereinbefore explained in various other applications, but in all uses of the valve the same essential elements will be embodied, and changes in the proportions, dimensions and minor details may be adopted when found necessary in various applications of the valve without departing from the nature or spirit of the invention.

What is claimed as new is:

1. The combination with a valve casing having a chamber with an inlet and an outlet, of a valve unit comprising a plug having an integral cage with a rim, the plug having an opening for permitting passage of fluid therethrough, a hollow valve reciprocatingly mounted in the cage and having one end fully open and the opposite end closed and formed with a flat engaging surface, a spring engaging a portion of the plug and the interior of the valve, the valve being operable to open and close communication between parts of the said chamber, and a valve stem having one extremity disposed to separably bear on the flat engaging surface of the valve.

2. The combination with a valve casing having a chamber therein and a valve seat and an inlet and an outlet, of a valve unit comprising a plug with open means therethrough and having a cage fixed thereto, a hollow valve movable in the cage having one end closed and provided with a flat top and the opposite end fully open, means for automatically closing the valve relatively to said seat, and means for engaging the flat top of the valve and exerting pressure thereon to open the same, the means for engaging the flat top of the valve being structurally independent of and separable from the valve.

3. The combination with a valve casing having a chamber and a valve seat therein and an inlet and an outlet, of a valve unit organization consisting of a plug with open means therethrough, a cage fixed to the plug and having a rim, a hollow valve reciprocatingly mounted in the cage and having a flat closed extremity and an opposite open extremity, spring means engaging the interior of the valve and a portion of the plug tending to close said valve, the plug, cage, valve and spring means being assembled for simultaneous application and seating and also removal with relation to a portion of the valve casing, and a stem movably mounted in the valve casing and having an extremity disposed to exert pressure contact with relation to the flat extremity of the valve to open the valve against the tension of the spring means, the stem being structurally independent of and separable from the valve.

4. The combination with a valve casing, of a valve unit organization for removable application to the valve casing, comprising a plug having fastening means to cooperate with the valve casing, a cage fixed to the plug, a hollow valve reciprocatingly mounted in the cage and having one end open and the opposite end closed and formed with a flat engaging surface, the valve being operable to respectively open and close communication between parts of the valve casing, the valve adapted to be opened by pressure contact with the flat engaging surface thereof, and means also engaging the valve for normally disposing the same in closed position.

5. The combination with a valve casing having a chamber with a valve seat therein and an inlet and an outlet, of a plug removably fitted in a part of the casing and having an opening therethrough, a cage integrally formed with the plug and having a guide rim, a hollow valve fully open at one end and sealed at the opposite end by a flat closure and shaped to engage the valve seat, a spring mounted in the said valve and having one extremity engaging the inner portion of the flat closure and the opposite extremity associated with a portion of the plug, and a valve stem shiftably mounted in a portion of the casing and having a round free extremity to contact with the flat closure of the valve to open the latter simply by pressure, the valve stem being structurally independent and separable from the said valve.

In testimony whereof I have hereunto set my hand.

FRANK S. CRAVENS.